(12) United States Patent
Thordarson

(10) Patent No.: US 6,698,183 B1
(45) Date of Patent: Mar. 2, 2004

(54) HYDROGEN MOTOR

(76) Inventor: Petur Thordarson, 180 Juniper Ave., Carlsbad, CA (US) 92008

(*) Notice: Subject to any disclaimer, the term of this patent is extended or adjusted under 35 U.S.C. 154(b) by 0 days.

(21) Appl. No.: 10/305,922

(22) Filed: Nov. 26, 2002

Related U.S. Application Data

(60) Continuation of application No. 10/085,558, filed on Feb. 26, 2002, now Pat. No. 6,484,491, which is a division of application No. 09/659,391, filed on Sep. 11, 2000, now abandoned.

(51) Int. Cl.$^7$ ................................................ F02C 5/00
(52) U.S. Cl. ...................... 60/39.6; 60/39.465; 60/39.55
(58) Field of Search .......................... 60/39.6, 39.465, 60/39.05, 39.55, 721, 221, 211, 222

(56) References Cited

U.S. PATENT DOCUMENTS

| | | |
|---|---|---|
| 368,678 A | 8/1887 | McDougall |
| 632,662 A | 9/1899 | Tatham |
| 676,164 A | 6/1901 | Villar |
| 971,699 A | 10/1910 | Solomon |
| 1,117,351 A | 11/1914 | Edlin |
| 2,463,820 A | 3/1949 | Stafford et al. |
| 2,885,988 A | 5/1959 | Myers |
| 3,603,091 A | 9/1971 | Stahmer |
| 3,608,529 A | 9/1971 | Smith |
| 3,844,262 A | 10/1974 | Dieges |
| 3,867,812 A | 2/1975 | Van Arsdel |
| 3,963,000 A | 6/1976 | Kosaka et al. |
| 4,004,554 A | 1/1977 | Kosaka et al. |
| 4,015,626 A | 4/1977 | Thordarson |
| 4,057,961 A | 11/1977 | Payne |
| 4,096,746 A | 6/1978 | Wilson et al. |
| 4,112,875 A | 9/1978 | Laumann et al. |
| 4,210,171 A | 7/1980 | Rikuta |
| 4,282,835 A | 8/1981 | Peterson et al. |
| 4,308,720 A | 1/1982 | Brandstadter |
| RE31,049 E | 10/1982 | Brian |
| 4,474,140 A | 10/1984 | Sternfeld et al. |
| 4,629,561 A | 12/1986 | Shirato et al. |
| 4,777,801 A | 10/1988 | Porter |
| 4,825,650 A | 5/1989 | Hosford |
| 4,876,991 A | 10/1989 | Galitello, Jr. |
| 5,067,467 A | 11/1991 | Hill et al. |
| 5,329,966 A | 7/1994 | Fenimore et al. |
| 5,647,734 A | 7/1997 | Milleron |
| 5,709,077 A | 1/1998 | Beichel |
| 6,026,849 A | 2/2000 | Thordarson |
| 6,484,491 B1 * | 11/2002 | Thordarson .................. 60/211 |

\* cited by examiner

*Primary Examiner*—Hoang Nguyen
(74) *Attorney, Agent, or Firm*—Michael R. Schacht; Schacht Law Office, Inc.

(57) ABSTRACT

A system for converting hydrogen into mechanical energy. The system comprises a combustion chamber, an ignition system, and accumulator, a propulsion system, and a control valve. Hydrogen, oxygen, and water are introduced into the combustion chamber. The ignition system ignites a mixture of hydrogen and oxygen in the combustion chamber. A source of working fluid is operatively connected to the combustion chamber such that expanding fluid within the combustion chamber acts on the working fluid to pressurize the working fluid. The accumulator is connected to the combustion chamber such that pressurized fluid within the combustion chamber flows into the accumulator. The propulsion system comprises a cylinder and a piston member arranged within the cylinder. The control valve is connected between the accumulator and the cylinder to control a flow of pressurized working fluid from the accumulator to the cylinder to cause the piston member to move relative to the cylinder.

18 Claims, 11 Drawing Sheets

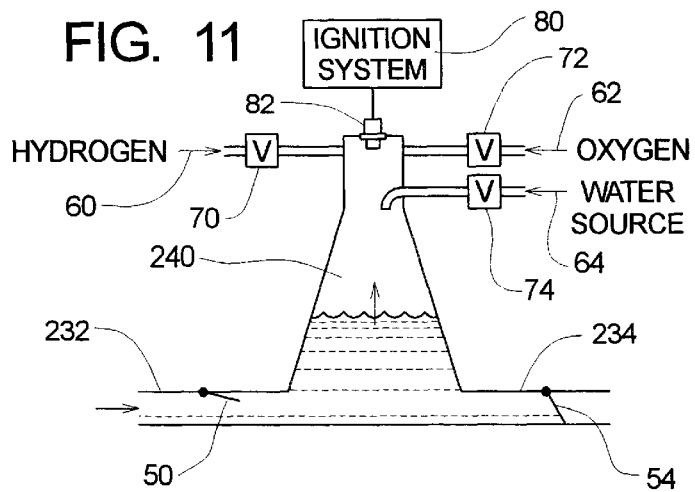
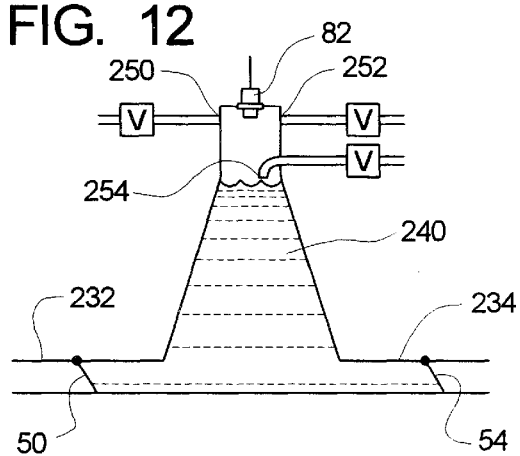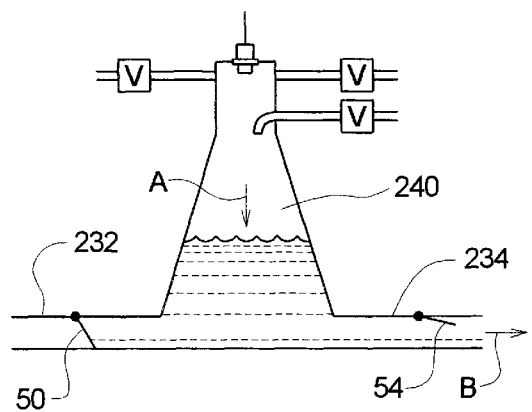
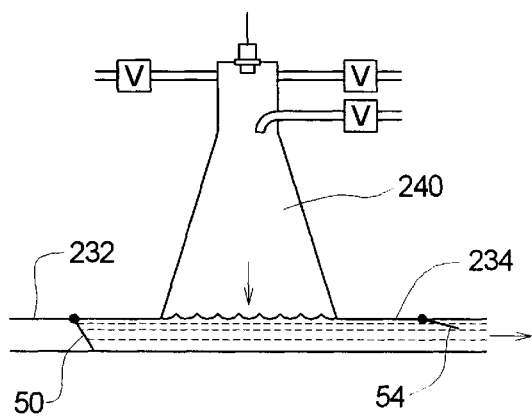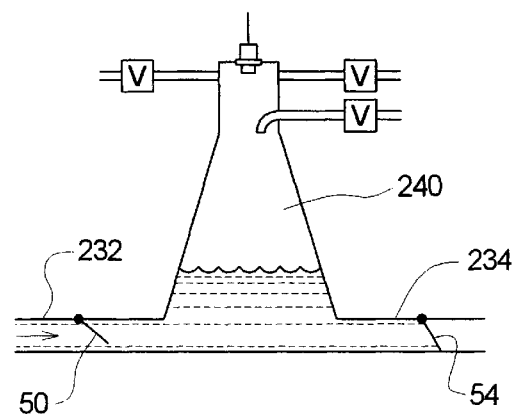

HYDROGEN MOTOR

RELATED APPLICATIONS

This is a continuation of U.S. patent application Ser. No. 10/085,558 filed on Feb. 26, 2002, now U.S. Pat. No. 6,484,491, which is a divisional of U.S. patent application Ser. No. 09/659,391 filed on Sep. 11, 2000, now abandoned.

TECHNICAL FIELD

The present invention relates to motors creating mechanical movement and, more specifically, to motors that are designed to displace a piston member using hydrogen as a fuel source.

BACKGROUND OF THE INVENTION

For a number of reasons, hydrogen has often been proposed for use as motor fuel. One important reason for considering hydrogen as a motor fuel is that, when hydrogen is burned in air to release energy, water is the primary byproduct. Carbon dioxide is not produced, so hydrogen creates fewer greenhouse gasses at the point of combustion than gasoline when used as a fuel source.

In addition, certain primary energy sources, such as solar and electrical energy, do not lend themselves to mobile applications. Solar power does not generate sufficient power on a continuous basis for many mobile applications, and the storage of electricity generated by solar or other means in batteries presents additional problems. These primary energy sources can, however, be readily used to convert water into hydrogen using electrolysis. The hydrogen so produced can be stored and burned at locations remote from the solar or other source of electrical energy.

Currently, hydrogen can be obtained relatively inexpensively from methane, or natural gas, using steam methane reforming; in the near term, hydrogen can thus be produced from methane as long as methane is available cheaply and in large quantities.

In the future, it may be practical to generate hydrogen using either a fermentation process or a photosynthesis process; either of these processes might result in a clean, renewable source of hydrogen for use as a motor fuel.

For these and other reasons, the need exists for efficient, reliable, and inexpensive motors that operate with hydrogen as a fuel source.

RELATED ART

The Applicant is aware of a number of attempts to use hydrogen as a substitute fuel for gasoline or diesel oil in conventional internal combustion engines. An adapted internal combustion engine converts the chemical en erg y of t he hydrogen directly into mechanical energy without the intermediate step of acting on a working fluid. The combustion cycle thus may not be optimum for efficient operation of one or the other of the combustion of the hydrogen or the conversion of the released chemical energy into mechanical work.

The Applicant is also aware of an attempt to propel watercraft using hydrogen as a fuel. A water path was created from the bow to the stern of the boat. A combustion chamber was connected to the water path such that water at least partly filled the combustion chamber before each combustion cycle. A hydrogen/oxygen mixture was ignited within the combustion chamber such that the ignited mixture acted directly on the water in the combustion chamber. The water was thus forced out of the combustion chamber and directly out of the back of the boat to propel the boat in the water.

SUMMARY OF THE INVENTION

The present invention is a system for converting hydrogen into mechanical energy. In one form, the system comprises a combustion chamber, an ignition system, and accumulator, a propulsion system, and a control valve. Hydrogen, oxygen, and water are introduced into the combustion chamber. The ignition system ignites a mixture of hydrogen and oxygen in the combustion chamber. A source of working fluid is operatively connected to the combustion chamber such that expanding fluid within the combustion chamber acts on the working fluid to pressurize the working fluid. The accumulator is connected to the combustion chamber such that pressurized fluid within the combustion chamber flows into the accumulator. The propulsion system comprises a cylinder and a piston member arranged within the cylinder. The control valve is connected between the accumulator and the cylinder to control a flow of pressurized working fluid from the accumulator to the cylinder to cause the piston member to move relative to the cylinder.

BRIEF DESCRIPTION OF THE DRAWINGS

FIGS. 11–15 are somewhat schematic section views depicting the combustion cycle of the hydrogen motor of FIGS. 9 and 10.

DETAILED DESCRIPTION OF THE PREFERRED EMBODIMENTS

The present invention may be embodied in a wide variety of physical forms depending upon the nature of the physical work to be performed by the motor. Accordingly, the following discussion will present several relatively generic embodiments of the present invention and then several more specific embodiments of the present invention.

I. First Embodiment

Figure 1:
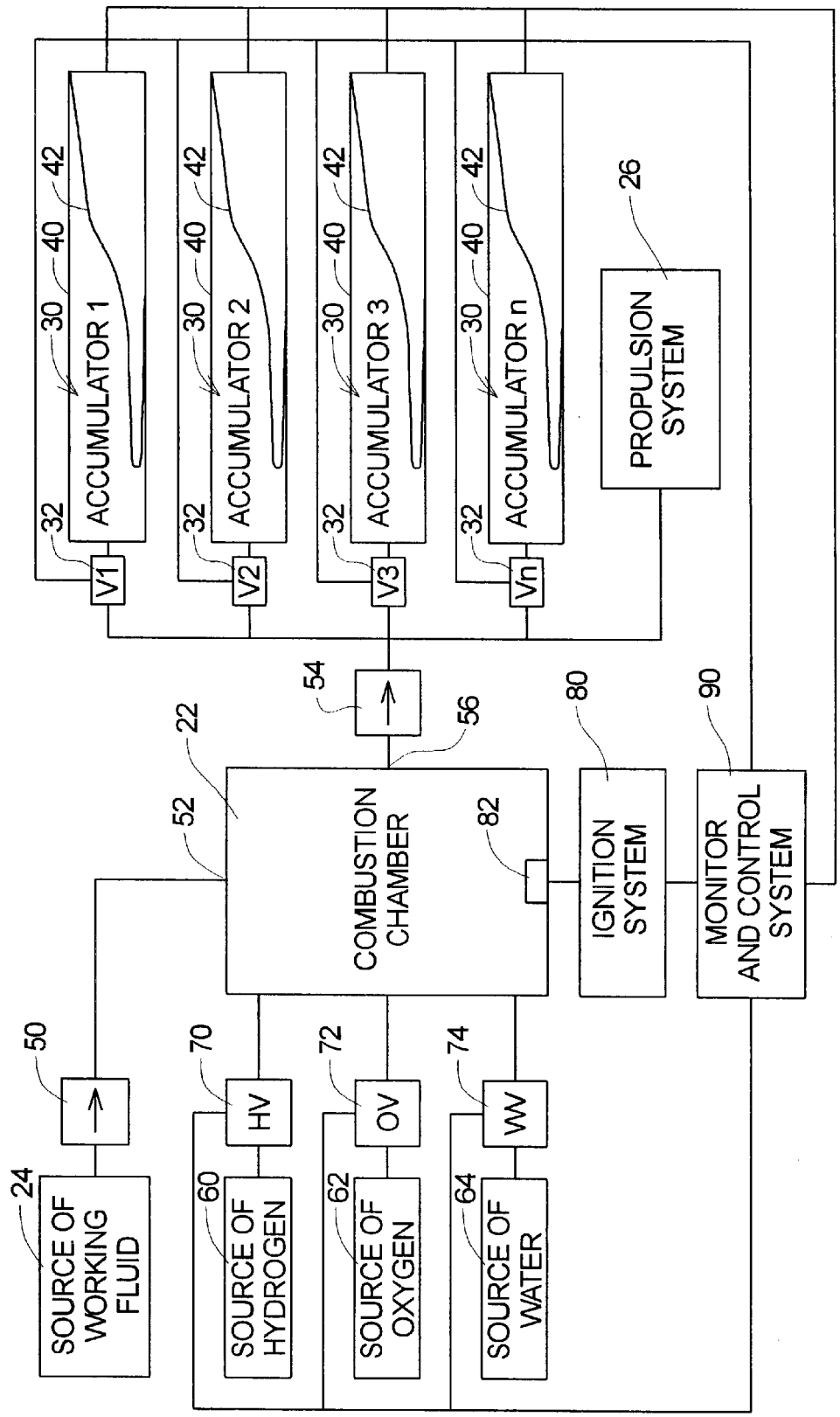
FIG. 1 is a block diagram of a first embodiment of a hydrogen motor of the present invention.

Referring initially to FIG. 1, depicted therein at 20 is a first embodiment of a hydrogen motor system constructed in accordance with, and embodying, the principles of the present invention. The motor system 20 comprises a combustion chamber 22 that supplies pressurized working fluid from a source of working fluid 24 to a propulsion system 26. The hydrogen motor system 20 further comprises an accumulator 30 and a control valve 32; the exemplary motor system 20 comprises a single accumulator 30 and a single control valve 32, but other arrangements are possible depending on factors such as the intended use of the motor.

In operation, hydrogen is ignited in the combustion chamber 22 such that the ignited hydrogen acts, either directly or indirectly, on working fluid from the source of working fluid 24. After the ignited hydrogen acts on the working fluid, the working fluid becomes pressurized. The pressurized working fluid flows to the propulsion system 26 and, to the extent that excess working fluid is available, to the accumulator 30. The accumulator 30 thus stores pressurized working fluid, and the control valve 32 allows the pressurized working fluid to be released from the accumulator 30 as required by the propulsion system 26. Normally, more than one ignition cycle in the combustion chamber 22 is required to fully pressurize the working fluid in the accumulator 30.

One purpose of the accumulator 30 and control valve 32 is to decouple the operation of the propulsion system 26 from the combustion cycle of the combustion chamber 22. In particular, the combustion chamber 22 may operate most efficiently at a given number of cycles per minute, while the propulsion system 26 may operate more efficiently at a much higher or lower number of cycles per minute. The accumulator 30 and control valve 32 operate to store energy in the form of pressurized working fluid and then deliver the pressurized fluid when required by and at flow rates optimal for the circumstances and the characteristics of the given propulsion system 26.

The accumulator 30 is or may be conventional and comprises a rigid tank member 40 and a bladder member 42. The tank member 40 is designed to safely withstand the maximum working pressures predetermined for the motor system 20; the predetermined maximum working pressure will depend upon the size and intended use of the motor system 20.

The bladder member 42 is designed to contain a pressurized gas, usually air, and is arranged within the tank member 40 such that pressurized working fluid entering the tank member 40 through the control valve 32 compresses the gas and causes the bladder member 42 to collapse or deflate. When the pressure of the working fluid within the tank member 40 is higher than the pressure of the working fluid on the other side of the control valve 32 and the control valve 32 is open, the gas will expand, causing the bladder member 42 to inflate and force the working fluid out of the tank member 40 through the control valve 32.

The control valve 32 must allow the flow of pressurized fluid to be accurately controlled even though the pressures on either side of the control valve 32 may fluctuate significantly. In particular, during use of the system 20 the pressure within the accumulator 30 is designed to change between a full state, in which the accumulator pressure is equal to the maximum working pressure of the motor system 20, and a low state, in which the accumulator pressure is equal to a predetermined cut-off pressure. In addition, the pressure of the working fluid in the system 20 at, for example, the propulsion system 26 will vary significantly depending upon the state of the combustion chamber 22 and the propulsion system 26. The control valve 32 must be capable of controlling the flow rate of the working fluid into and out of the accumulator 30 without regard for the fluctuations in the pressure of the working fluid on either side of the control valve 32.

The control valve 32 may be formed by any one of a number of conventional valve systems. However, the exemplary control valve 32 is preferably formed by a flow controller such as is disclosed in U.S. Pat. No. 6,026,849. A flow controller as described in the '849 patent allows precise control of the flow of fluid from a source to a destination while tolerating extreme fluctuations in pressures and flow rates at the source and destination. The teachings of the '849 patent are incorporated herein by reference.

In the present context, a flow controller as taught by the '849 patent would be arranged such that its input is connected to the accumulator 30 and its output is connected to the combustion chamber 22 and propulsion system 26. In this case, the control valve 32 may comprise a separate check valve arranged in parallel to the flow controller to allow flow of fluid from the combustion chamber 22 to the accumulator 30 whenever the pressure of the working fluid at the combustion chamber 22 is higher than the accumulator pressure. Of course, the flow controller as taught by the '849 patent may be modified to include an integral check valve that would perform this same function. The flow controller taught by the '849 patent should also be modified such that the flow rate is controlled by a remotely generate electrical signal rather than manual turning of a knob.

Referring now again to the drawing, FIG. 1 further illustrates that an input check valve 50 is preferably arranged between an inlet 52 of the combustion chamber 22 and the source of working fluid 24; the input check valve 50 may be incorporated into the combustion chamber 22 depending upon the circumstances. FIG. 1 also shows that the exemplary motor system 20 further comprises an outlet check valve 54 connected between an outlet 56 of the combustion chamber 22 and the control valve 32 and propulsion system 26.

In the exemplary system 20, the combustion chamber 22 is connected to sources of hydrogen 60, oxygen 62, and water 64 through hydrogen, oxygen, and water supply valves 70, 72, and 74, respectively. The hydrogen and oxygen supply valves 70 and 72 are controlled to create an optimum mixture of hydrogen and oxygen for combustion under a given set of circumstances.

The flow controller described in the '849 patent may also be used as the supply valves 70, 72, and 74. Again, the pressure upstream of the supply valves 70, 72, and 74 may vary significantly as the hydrogen, oxygen, and water in the sources 60, 62, and 64 is consumed. The pressure downstream of the supply valves 70, 72, and 74 will also vary significantly as the hydrogen/oxygen mixture is ignited within the combustion chamber 22. The flow controller of the '849 patent is capable of maintaining a finely controlled flow rate even when the upstream and downstream pressures fluctuate.

Water is introduced into the combustion chamber 22 through the water supply valve 74. When the hydrogen/oxygen mixture is ignited, it expands and can be converted to mechanical work. Water injected into the chamber 22 cools the chamber 22 and thus improves the efficiency at which the working fluid is returned to the chamber 22.

The ignition of the hydrogen and oxygen mixture is controlled by an ignition system 80 that is operatively connected to a spark plug 82. The ignition system 80 is designed to cause the spark plug 82 to generate a spark that ignites the hydrogen/oxygen mixture under control of a desired ignition sequence. The ignition sequence will depend upon numerous factors such as the intended use of the motor system 20 and environmental factors such as temperature, humidity, and the like.

Working fluid is thus drawn or forced into the combustion chamber through the source check valve 50. The steam created by combustion of the hydrogen and oxygen acts on the working fluid either directly or indirectly through a piston, membrane, or the like to pressurize the working fluid. The working fluid so pressurized flows out of the combustion chamber 22 through the outlet check valve 54. The water within the combustion chamber 22, which is either injected through the water supply valve 74 or created as a byproduct of the ignition of the hydrogen/oxygen mixture, is re-used or exhausted from the combustion chamber 22. This process is repeated in what will be referred to herein as the combustion cycle.

The operation of the control valve 32, the hydrogen, oxygen, and water supply valves 70, 72, and 74, and ignition system 80 is controlled by a monitor and control system 90. The monitor and control system 90 is also connected to the accumulator 30 to detect the accumulator pressure. The monitor and control system 90 will normally also allow user input in the form of a throttle signal, brake signal, turn signal, and the like generated by a user. These throttle, brake, turn, and other signals are generated and transmitted in a conventional manner depending upon the use of the motor system 20 and will not be described herein in detail herein.

The monitor and control system 90 is implemented by an integrated computer comprising RAM, ROM, and a CPU. The CPU implements control logic embodied by instructions and data stored in the RAM or ROM. The integrated computer that forms the monitor and control system 90 is or may be conventional and will not be described in detail herein.

The operation and use of the hydrogen motor system 20 will now be described in further detail. Initially, the accumulator 30 will be substantially empty of working fluid and the bladder members 42 fully inflated by the gas therein. A hydrogen/oxygen mixture and water will be introduced into the combustion chamber 22, and the mixture will be ignited to force pressurized working fluid through the outlet check valve 54 and control valve 32 and into the accumulator 30. When the pressure of the working fluid within the accumulator 30 exceeds a minimum threshold, which may be but is not necessarily at or slightly below the cut-off pressure described above, the propulsion system 26 may begin to operate by converting the energy of the pressurized working fluid into mechanical energy that performs useful work, such as propelling a vehicle or providing power to an industrial machine.

In the mean time, the combustion chamber 22 will continuously perform its combustion cycle until the pressure in the working fluid equals the maximum working pressure. If the propulsion system 26 is continuously operating at full power, it is possible that the pressure of the working fluid will never reach the maximum working pressure and the combustion chamber 26 will continuously perform its combustion cycle. Usually, the combustion chamber 26 will perform its combustion cycle until the pressure of the working fluid equals the maximum working pressure, at which point the combustion chamber 26 will become idle. The combustion chamber 26 will remain idle until the pressure of the working fluid equals the cut-off pressure, at which point the combustion chamber 26 will begin performing the combustion cycle.

The logic described above will be implemented by the monitor and control system 90. This system 80 monitors accumulator pressure to detect the pressure of the working fluid and controls the control valve 32, supply valves 70, 72, and 74, and ignition system 80 as necessary to cause the combustion chamber 22 to perform the combustion cycle.

The work performed by the propulsion system 26 is thus independent of the work performed when the hydrogen in the combustion chamber 22 is ignited because the energy is stored by the accumulator 30 and released as necessary by the control valve 32. The energy released from the hydrogen ignited in the combustion chamber 22 may thus have extreme highs and lows, which may be desirable to efficiently convert hydrogen into physical work, without disrupting smooth operation of the propulsion system 26.

II. Second Embodiment

Figure 2:
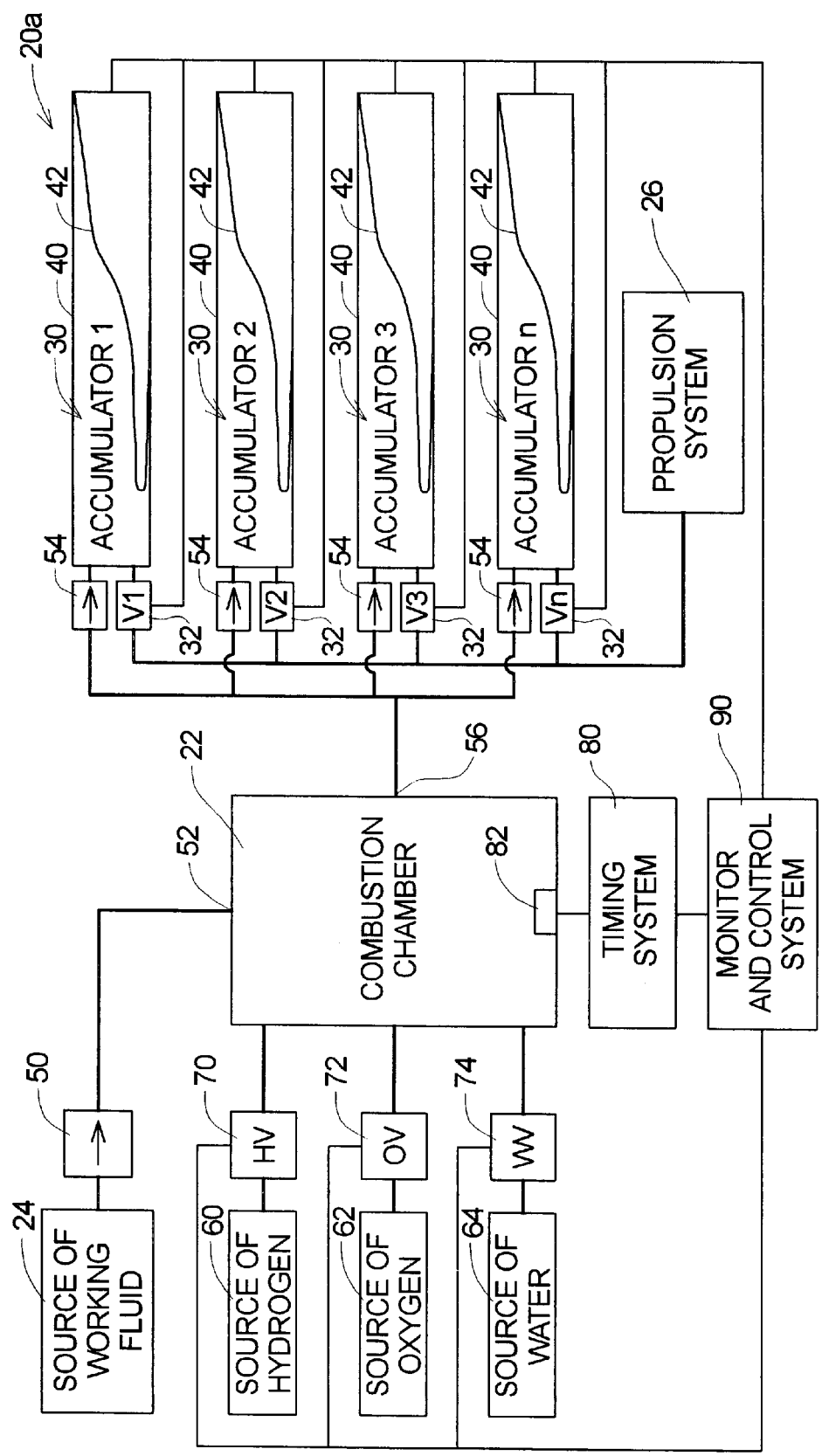
FIG. 2 is a block diagram of a second embodiment of a hydrogen motor of the present invention.

Referring now to FIG. 2, depicted 20*a* therein is a second embodiment of a hydrogen motor system constructed in accordance with, and embodying, the principles of the present invention. The motor system 20*a* is in many respects similar to the motor system 20 described above. Accordingly, the same reference characters will be used to identify like components in FIG. 2, and the system 20*a* will be described only to the extent that it differs from the system 20.

The system 20*a* has a plurality of accumulators 30, control valves 32, and outlet check valves 54. In particular, a control valve 32 and outlet check valve 54 is associated with each accumulator 30. Fluid flows into the accumulators 30 through the outlet check valves 54 when the pressure of the working fluid in the combustion chamber 22 is higher than the accumulator pressure. Fluid flows out-of the accumulators 30 and into the propulsion system 26 through the control valves 32. The control valves 32 thus control the flow of pressurized working fluid to the propulsion system 26.

III. Third Embodiment

Figure 3:
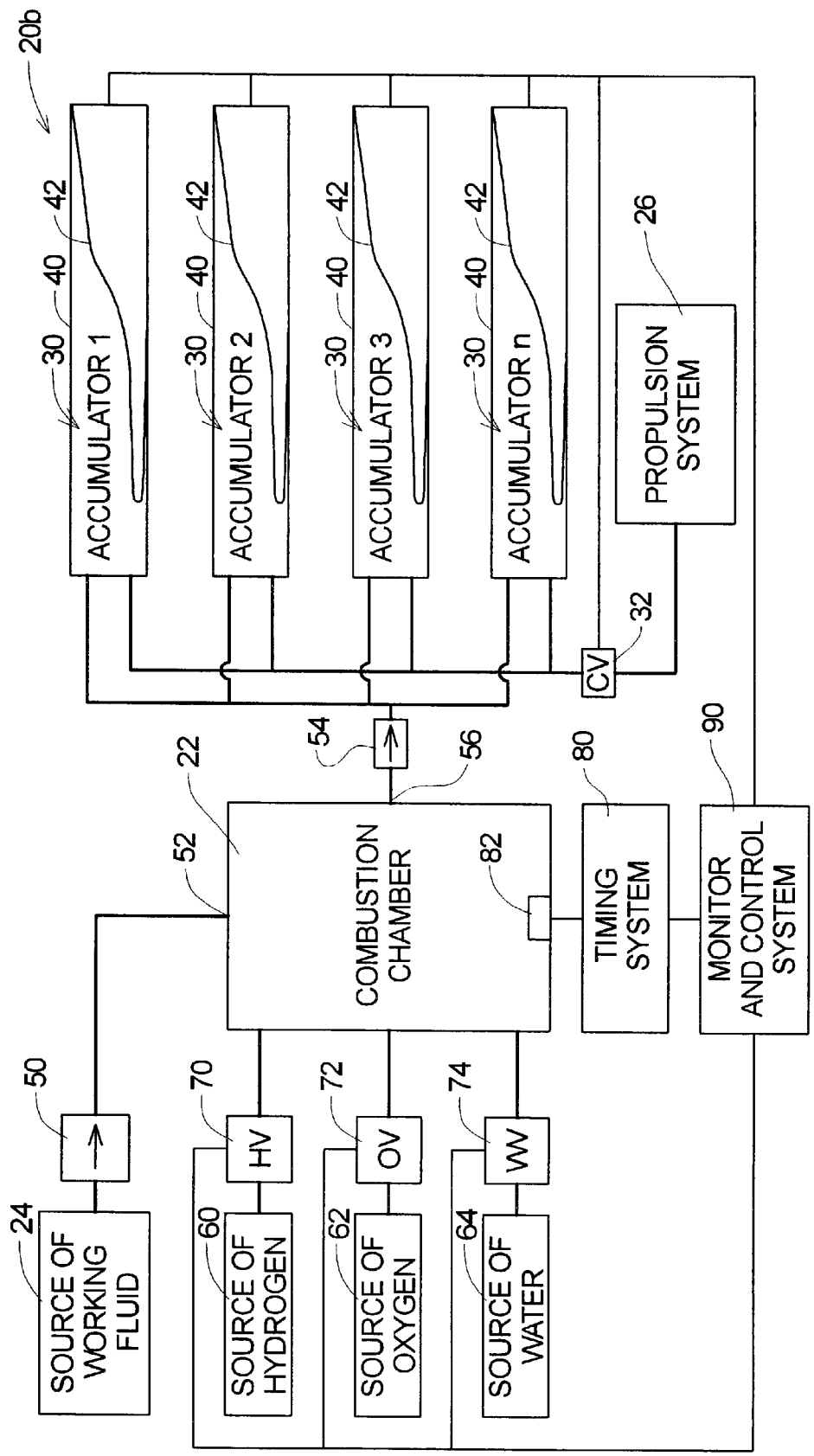
FIG. 3 is a block diagram of a third embodiment of a hydrogen motor of the present invention.

Referring now to FIG. 3, depicted 20*b* therein is a third embodiment of a hydrogen motor system constructed in accordance with, and embodying, the principles of the present invention. The motor system 20*b* is in many respects similar to the motor system 20 described above. Accordingly, the same reference characters will be used to identify like components in FIG. 3, and the system 20*b* will be described only to the extent that it differs from the system 20.

The system 20*b* has a plurality of accumulators 30 and a single control valve 32 and single outlet check valve 54. Fluid flows into the accumulators 30 through the outlet check valve 54 when the pressure of the working fluid in the combustion chamber 22 is higher than the accumulator pressure. Fluid flows out of the accumulators 30 and into the propulsion system 26 through the single control valve 32. The single control valve 32 thus controls the flow of pressurized working fluid to the propulsion system 26.

IV. Fourth Embodiment

Figure 4:
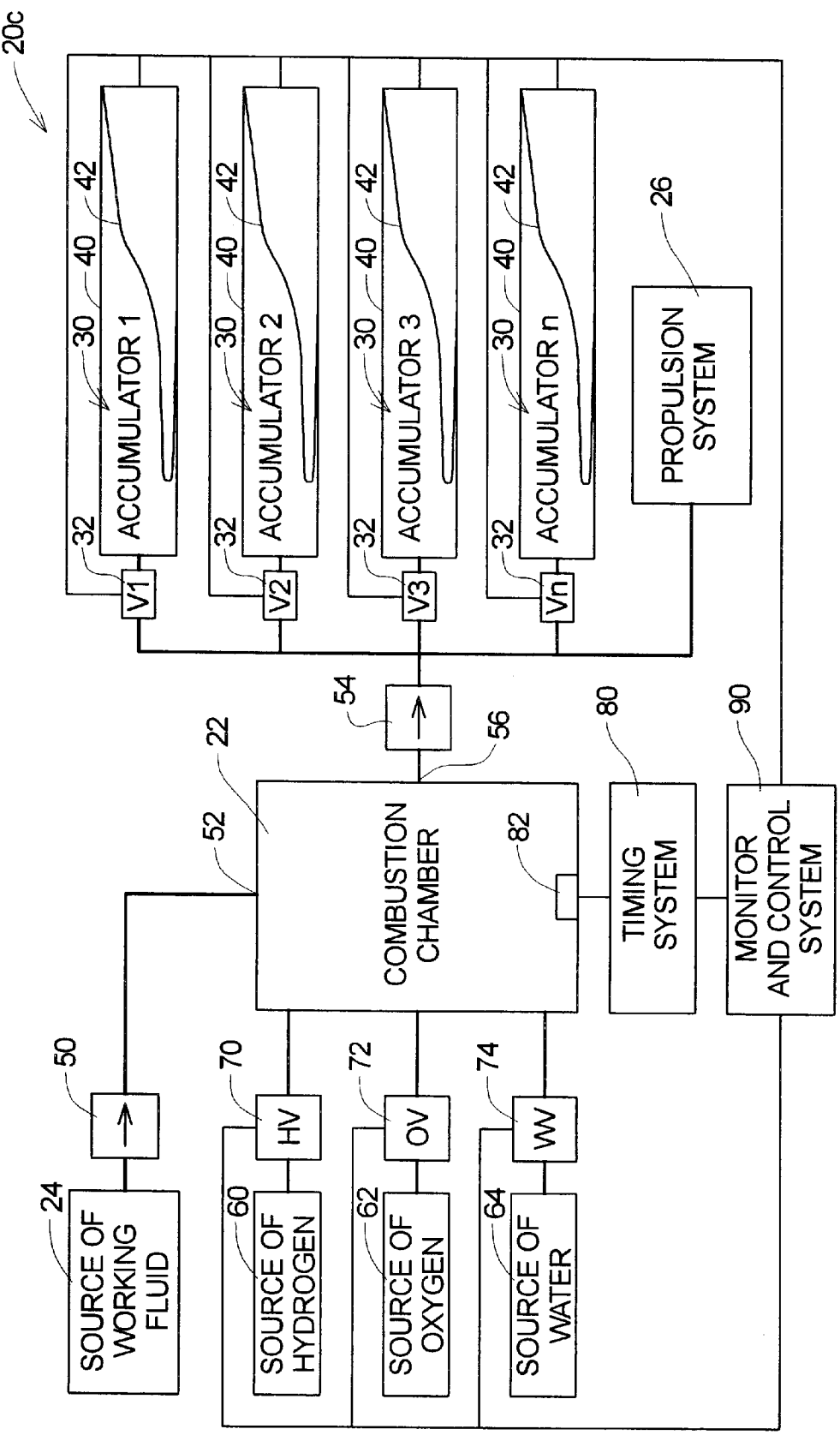
FIG. 4 is a block diagram of a fourth embodiment of a hydrogen motor of the present invention.

Referring now to FIG. 4, depicted 20*c* therein is a fourth embodiment of a hydrogen motor system constructed in accordance with, and embodying, the principles of the present invention. The motor system 20*c* is in many respects similar to the motor system 20 described above. Accordingly, the same reference characters will be used to identify like components in FIG. 4, and the system 20*c* will be described only to the extent that it differs from the system 20.

The system 20*c* has a plurality of accumulators 30 and control valves 32 and a single outlet check valve 54. One control valve 32 is associated with each of the accumulators 30. Fluid flows into the accumulators 30 through the outlet check valve 54 and the control valves 32 when the pressure of the working fluid in the combustion chamber 22 is higher than the accumulator pressure. Fluid flows out of the accumulators 30 and into the propulsion system 26 through the control valves 32. The control valves 32 thus control the flow of pressurized working fluid to the propulsion system 26.

V. Fifth Embodiment

Figure 5:
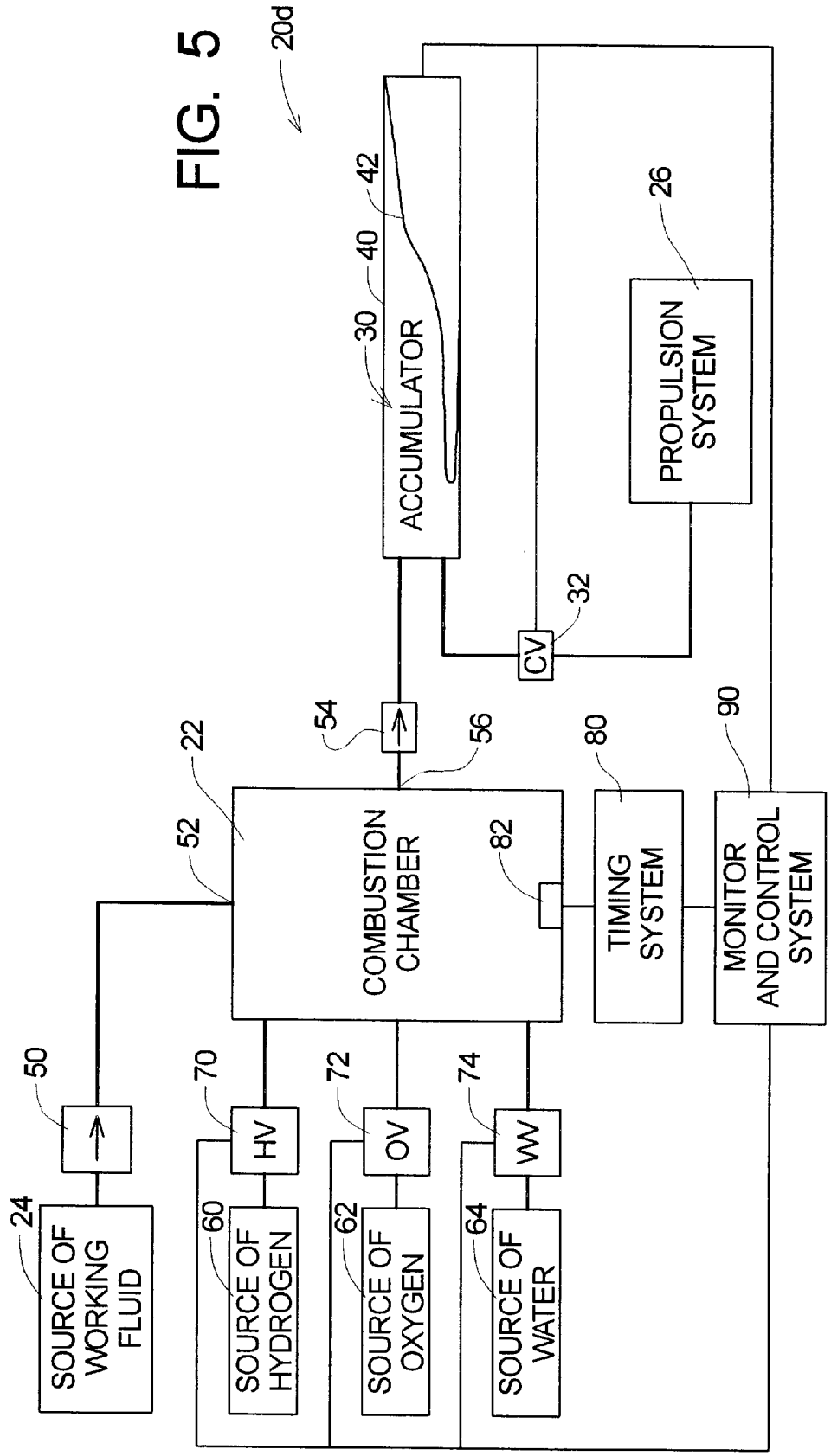
FIG. 5 is a block diagram of a fifth embodiment of a hydrogen motor of the present invention.

Referring now to FIG. 5, depicted 20d therein is a fifth embodiment of a hydrogen motor system constructed in accordance with, and embodying, the principles of the present invention. The motor system 20d is in many respects similar to the motor system 20 described above. Accordingly, the same reference characters will be used to identify like components in FIG. 5, and the system 20d will be described only to the extent that it differs from the system 20.

The system 20d has a single accumulator 30, control valve 32, and outlet check valve 54. Fluid flows into the accumulator 30 through the outlet check valve 54 when the pressure of the working fluid in the combustion chamber 22 is higher than the accumulator pressure. Fluid flows out of the accumulator 30 and into the propulsion system 26 through the control valve 32. The control valve 32 thus controls the flow of pressurized working fluid to the propulsion system 26.

VI. Sixth Embodiment

Figure 6:
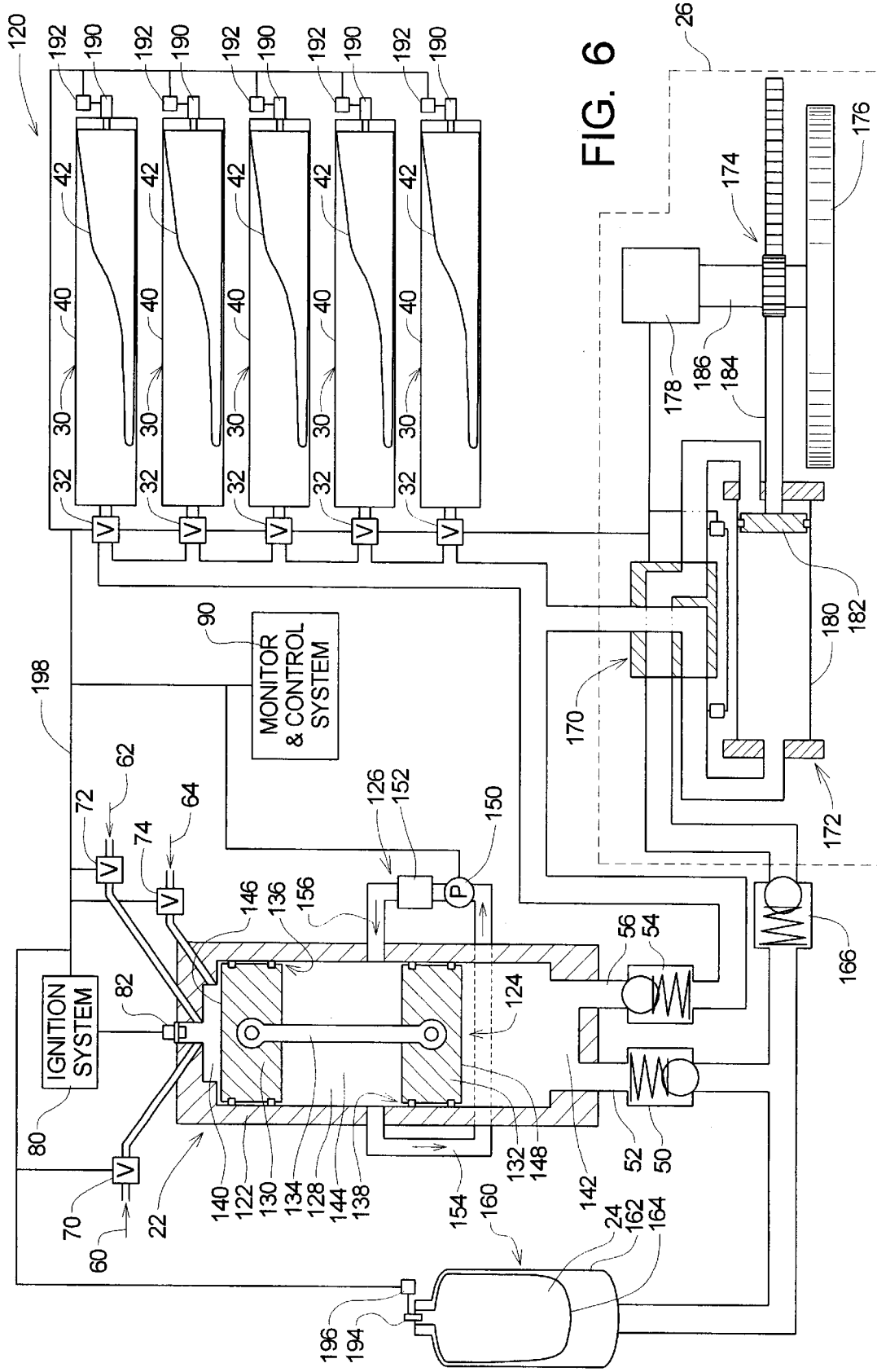
FIGS. 6–8 are schematic diagrams depicting the combustion cycle of a sixth embodiment of a hydrogen motor of the present invention.
Figure 7:
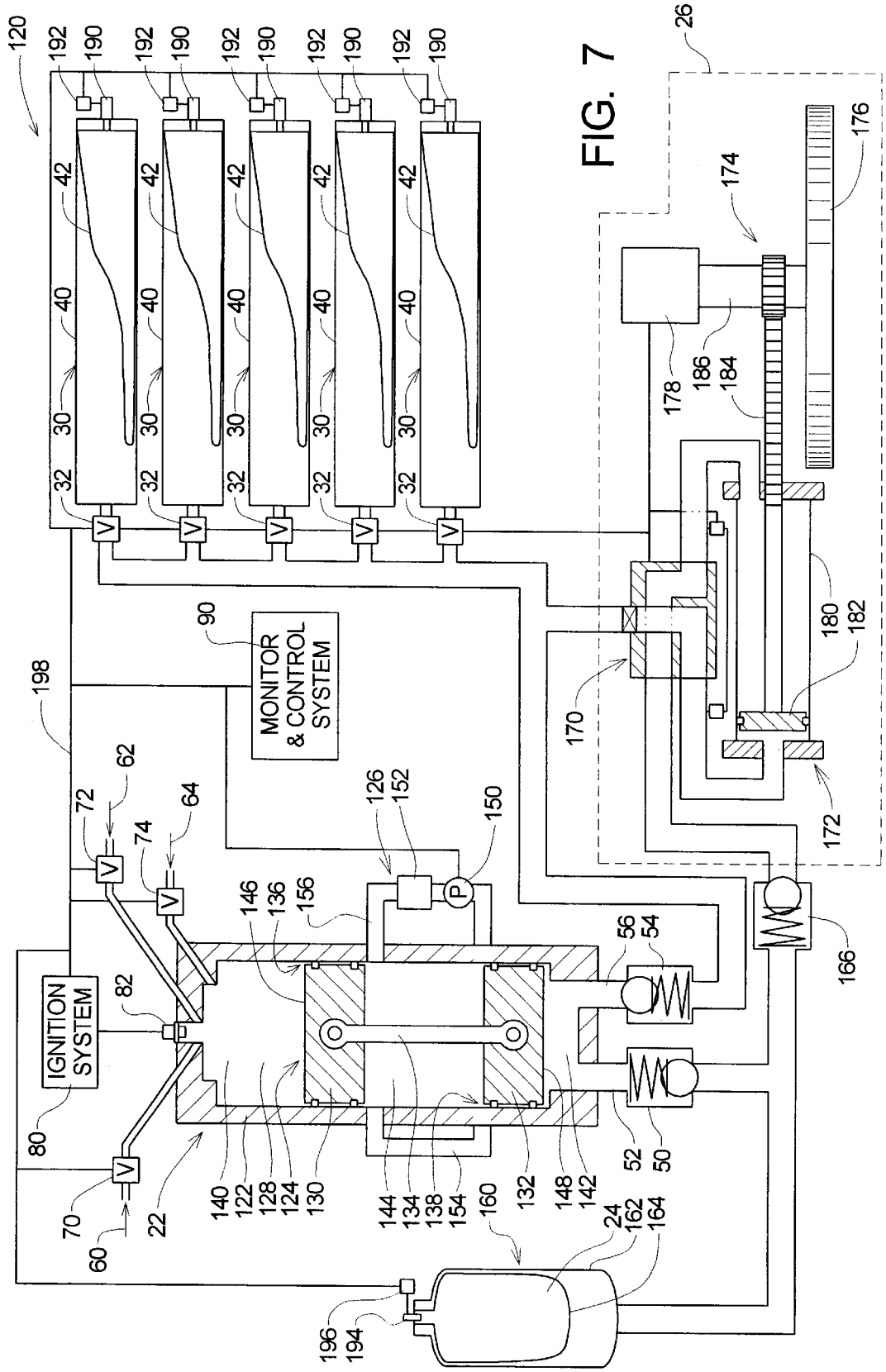
Figure 8:
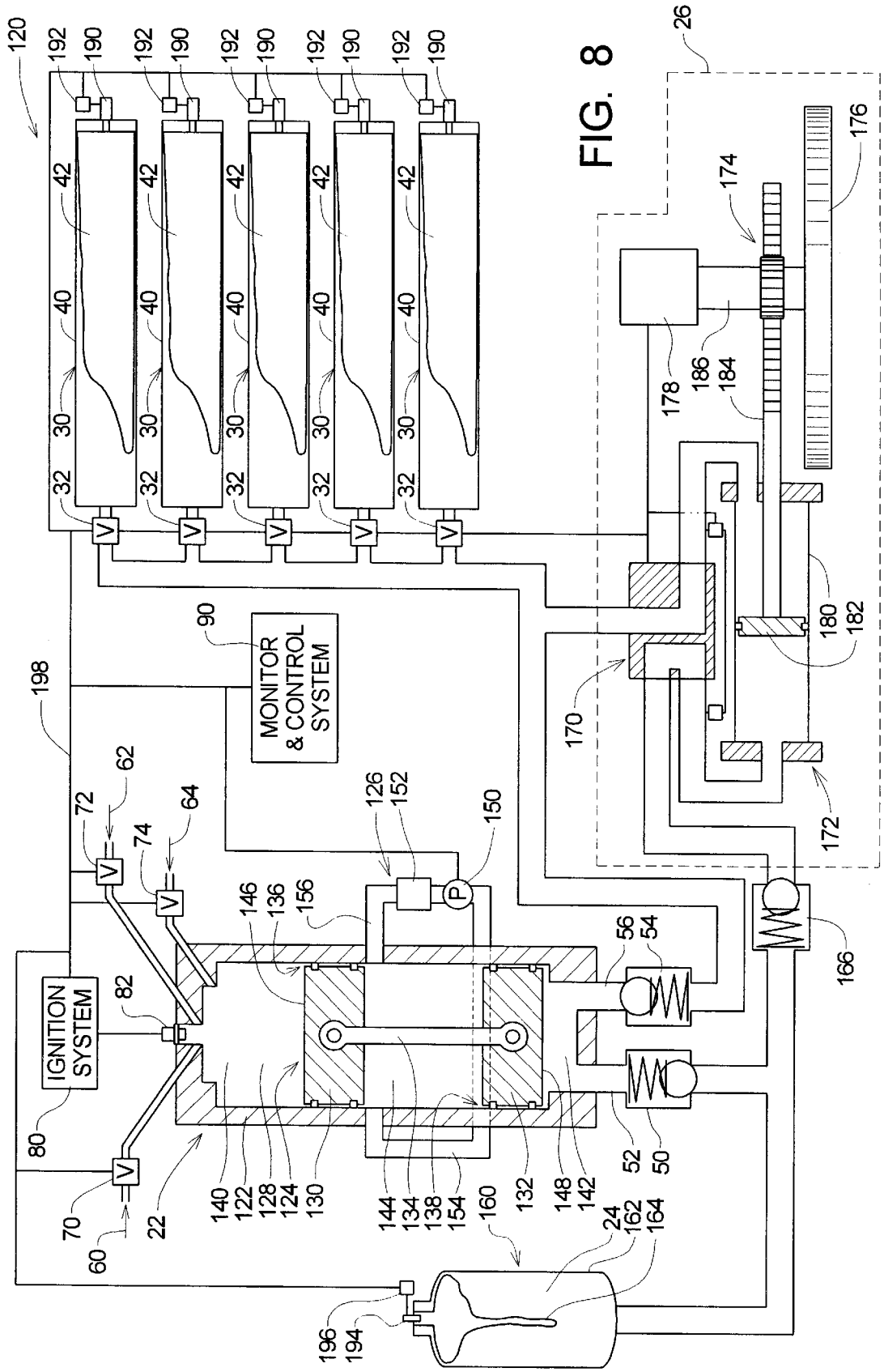

Referring now to FIGS. 6–8, depicted therein is a sixth exemplary hydrogen motor system 120 constructed in accordance with, and embodying, the principles of the present invention. The motor system 120 is optimized to generate rotational motion such as would be appropriate for causing rotation of the driving wheels of an automobile, but the motor system 120 can provide power to any machine adapted to operate from a rotating shaft.

The hydrogen motor system 120 is similar in certain respects to the hydrogen motor system 20 described above, and the same reference characters used above with reference to the system 20 will be used to identify similar elements of the system 120; these similar elements will not be described again herein beyond what is necessary for a complete understanding of the system 120.

As shown in FIGS. 6–8, the hydrogen motor system 120 comprises a combustion chamber 22, a source of working fluid 24, a propulsion system 26, at least one accumulator 30, and at least one control valve 32. The exemplary motor system 120 comprises five accumulators 30 and a control valve 32 for each accumulator 30, but, as generally discussed above, other arrangements are possible depending on the specific use of the motor. The exemplary accumulators 30 comprise a rigid tank member 40 and a bladder member 42. An input check valve 50 is preferably arranged between an inlet 52 of the combustion chamber 22 and the source of working fluid 24, and an outlet check valve 54 connected between an outlet 56 of the combustion chamber 22 and the control valves 32 and propulsion system 26. The combustion chamber 22 is connected to sources of hydrogen 60, oxygen 62, and water 64 (schematically depicted in FIGS. 6–8) through hydrogen, oxygen, and water supply valves 70, 72, and 74, respectively. The exemplary motor system 120 also comprises an ignition system 80, spark plug 82, and a monitor and control system 90. The flow controller described in the '849 patent may be used as the control valves 32 and the supply valves 70, 72, and 74 as generally described above.

The exemplary combustion chamber 22 of the motor system 120 comprises a housing member 122, a piston assembly 124, and a cleaning system 126. The housing member 122 defines a piston chamber 128. The piston assembly 124 comprises a first piston member 130, a second piston member 132, and a spacing member 134 that spaces the first and second piston members 130 and 132 a fixed distance from each other. The piston assembly 132 comprises first and second seal assemblies 136 and 138 that and define first (upper) and second (lower) chamber portions 140 and 142 of variable volume and a third (intermediate) chamber portion 144 of fixed volume.

A first working surface 146 is formed on the first piston member 130 and partly defines the first chamber portion 140, while a second working surface 148 is formed on the second piston member 132 and partly defines the second chamber portion 142.

The piston assembly 132 is arranged to move within the piston chamber 128 between a first position (FIGS. 6 and 8) and a second position (FIG. 7). When the hydrogen/oxygen mixture is ignited, the steam created acts on the first working surface 146 and forces the piston assembly 124 from the first position to the second position. When moving from the first position to the second position, the second working surface 148 of the piston assembly 124 forces working fluid out of the second chamber portion 142 through the outlet check valve 54. When the piston assembly 124 reaches the second position, the pressure in the first chamber portion 140 is released, at which point pressurized working fluid stored in the fluid source 24 flows through the inlet check valve 50 into the second chamber portion 142 and acts on the second working surface 148 to return the piston assembly 124 to its first position. Movement of the piston assembly 124 from the first position to the second position and back to the first position constitutes one complete combustion cycle.

The cleaning system 126 comprises a pump 150, a filter 152, a filter inlet pipe 154, and a filter outlet pipe 156. The filter inlet and outlet pipes 154 and 156 are connected to the housing member 122 to allow fluid to flow out of and back into the third chamber portion 144. The pump 150 draws fluid from the third chamber portion 144 through the filter inlet pipe 154 and forces fluid back into the third chamber portion 144 through the filter 152 and filter outlet pipe 156. The filter 152 is designed to remove impurities from the fluid in the third chamber portion 155. In particular, the exemplary filter 152 is designed to remove water and other impurities from hydraulic fluid as will be described in further detail below.

The exemplary source of working fluid 24 comprises a bladder tank assembly 160 comprising a tank member 162 and a bladder member 164. Such bladder tank assemblies are well-known, and the details of construction and operation of the bladder tank assembly 160 will not be discussed herein in detail.

In the exemplary motor system 120, the working fluid is hydraulic fluid contained in a closed system. The bladder tank assembly 160 is thus connected to the propulsion system 26 through a return check valve 166 such that the hydraulic fluid is returned to the source of hydraulic fluid 24 after it has been used by the propulsion system 26. After the hydraulic fluid has been used by the propulsion system 26, the hydraulic fluid is pressurized, but the pressure is relatively low. The bladder tank assembly 160 stores this relatively low pressure hydraulic fluid so that the hydraulic fluid may be returned to the combustion chamber 22 through the inlet check valve 50 as described above.

The amount of hydraulic fluid in the second chamber portion 142 of the piston chamber 128, in the propulsion system 26, and in the various conduits connecting the chamber portion 142, propulsion system 26, bladder tank assembly 160, and accumulators 30 will be substantially constant and will be referred to herein as the baseline fluid. Fluid stored in the accumulators and bladder tank assembly 160 (not the baseline fluid) will be referred to as reserved hydraulic fluid. The bladder tank assembly 160 is sized and dimensioned to store reserved hydraulic fluid that is not stored in the accumulators 30. The reserved hydraulic fluid flows between the accumulators 30 and the bladder tank assembly 160 as the pressure in the accumulators 30 fluctuates: the higher the pressure in the accumulators 30, the lower the percentage of reserved hydraulic fluid stored in the bladder tank assembly 160; the lower the pressure in the accumulators 30, the higher the percentage of reserved hydraulic fluid stored in the bladder tank assembly 160.

The propulsion system 26 of the exemplary motor system 120 will now be described in further detail. The propulsion system 26 comprises a valve array 170, a piston assembly 172, a power transmission assembly 174, a flywheel 176, and a vehicle transmission 178.

Comparing FIGS. 6–7, it can be seen that the valve array 170 is schematically depicted and changes between a first state (FIGS. 6 and 7) and a second state (FIG. 8). The design and construction of the valve array 170 is conventional and will not be described herein in further detail.

The piston assembly 172 comprises a piston housing 180, a piston member 182, and piston rod 184. The piston rod 184 is rigidly connected to the piston member 182 at one end and extends out of the piston housing 180 such that its other end is rigidly connected to the power transmission assembly 174. The piston member 182 thus moves within the piston housing 180 between a first position (to the left in FIGS. 6–8) and a second position (to the right in FIGS. 6–8). The piston rod 184 moves with the piston member 182 in both direction along a longitudinal axis of the rod 184.

The exemplary propulsion system 26 further comprises a transmission shaft 186 that operatively connects the power transmission assembly 174 to the flywheel 176 and vehicle transmission 178. The power transmission assembly 174 is or may be conventional and translates, through the transmission shaft 186, linear movement of the piston rod 184 in both directions along its axis into rotational movement of the flywheel 176. The flywheel 176 is also conventional and stores energy in the form of rotational motion. The vehicle transmission 178 is also conventional and allows the vehicle operator to control, as desired, transmission of rotational motion of the transmission shaft 186 to vehicle wheels, propeller, or the like, to move the vehicle in which the motor system 120 is mounted.

The accumulators 30 of the motor system 120 further comprise pressure ports 190 and pressure sensors 192 arranged to detect the pressure of the gas within the bladder members 42; this pressure corresponds to the pressure of the working fluid within the tank member 40 and is used by the monitor and control system 90 to control combustion within the combustion chamber 22. A pressure port 194 and pressure sensor 196 are attached to the bladder tank assembly 160 to the pressure within the tank assembly 160 to be similarly monitored.

The monitor and control system 90 of the exemplary motor system 120 comprises a data bus 198 that is operatively connected to the control valves 32, supply valves 70, 72, and 74, ignition system 80, valve array 170, vehicle transmission 178, and pressure sensors 192 and 194. The monitor and control system 90 thus implements logic that operates the control valves 32, supply valves 70, 72, and 74, ignition system 80, valve array 170 based on the status of data obtained from the vehicle transmission 178 and pressure sensors 192 and 194. Other aspects of the motor system 120, such as positions of the piston members 130, 132, and 182, pressure in the combustion chamber 22, state of the valve array 170, and the like, can be monitored and used by the monitor and control system 90 to control the operation of the motor 120.

The motor system 120 operates in the same basic manner as the system 20 described above. Water is introduced into the first portion 140 of the combustion chamber 22 such that the water in the combustion chamber 22 turns to steam upon ignition of the hydrogen/oxygen mixture under control of the ignition system 80.

Assuming that the ignition cycle begins with the piston assembly 124 in the second position, the bladder tank assembly 160 forces hydraulic fluid into the combustion chamber through the source check valve 50 to return the piston assembly 124 to the first position. The steam created by combustion of the hydrogen and oxygen acts on the first working surface 146 to force the piston assembly 124 back into the second position; the second working surface 148 of the piston assembly 124 pressurizes the working hydraulic fluid within the second chamber portion 142. The working fluid so pressurized flows out of the combustion chamber 22 through the outlet check valve 54. This process is repeated to form the combustion cycle of the exemplary motor 120.

When the combustion cycle is first started, the accumulators 30 will be substantially empty of working hydraulic fluid; the working hydraulic fluid will be mostly stored in the bladder tank assembly 160. As the pressurized working fluid is forced through the outlet check valve 54 and control valves 32 and into the accumulators 30, the pressure within the accumulators 30 will increase and the amount of hydraulic fluid within the bladder tank assembly 160 will decrease.

When the pressure of the working fluid within the accumulators 30 exceeds a minimum threshold that is slightly below the cut-off pressure described above, the propulsion system 26 may begin to operate by converting the energy of the pressurized working fluid into mechanical energy that can be used by the vehicle transmission 178. In particular, if the piston member 182 is in its first position, the valve array 170 will be placed in its first state such that pressurized hydraulic fluid in the accumulators 30 flows into a first end of the piston housing 180 to force the piston member 182 from the first position to the second position. The valve array 170 is then placed in its second state such that pressurized hydraulic fluid in the accumulators 30 flows in a second end of the piston housing 180 to force the piston member 182 from the second position back to the first position. As the piston member 182 is forced between its first and second positions, the piston rod 184 reciprocates along its longitudinal axis, and the power transmission 174 coverts this linear movement into rotational movement of the transmission shaft 186.

Independent of the state of the valve array 170 and position of the piston member 182, the combustion chamber 22 will continuously perform its combustion cycle until the pressure in the working fluid equals the maximum working pressure. If the propulsion system 26 is continuously operating at full power, it is possible that the pressure of the working fluid will never reach the maximum working pressure and the combustion chamber 26 will continuously perform its combustion cycle. Usually, however, the combustion cycle will be performed until the pressure of the working fluid equals the maximum working pressure, at which point the combustion chamber 26 will become idle. The combustion chamber 26 will remain idle until the pressure of the working fluid equals the cut-off pressure, at which point the combustion chamber 26 will begin performing the combustion cycle.

The work performed by the propulsion system 26 is thus independent of the work performed when the hydrogen in the combustion chamber 22 is ignited because the energy is stored by the accumulators 30 and released as necessary by the control valves 32. The energy released from the hydrogen ignited in the combustion chamber 22 may thus have extreme highs and lows, which may be desirable to efficiently convert hydrogen into physical work, without disrupting smooth operation of the propulsion system 26.

VII. Seventh Embodiment

Referring now to FIGS. 5–11, depicted therein is a seventh exemplary hydrogen motor system 220 constructed in accordance with, and embodying, the principles of the present invention. The motor system 220 is optimized to generate pressurized fluid flow such as would be appropriate for a number of uses. For example, streams of pressurized fluid are used as cutting devices, and the pressurized fluid flow created by the motor system 220 could be used for such other purposes.

The motor system 220 is of particular relevance in the context of propelling a boat 222, however, and that application will be described herein in detail. The exemplary boat 222 is or may be any conventional watercraft, including a traditional boat or a personal watercraft such as a jet ski or the like. The exemplary boat 222 comprises a hull 224 capable of supporting the motor system 220, personnel, and cargo.

The hydrogen motor system 220 is similar in certain respects to the hydrogen motor systems 20 and 120 described above, and the same reference characters used above with reference to the system 20 will be used to identify similar elements of the system 220; these similar elements will not be described again herein beyond what is necessary for a complete understanding of the system 220.

Figure 9:
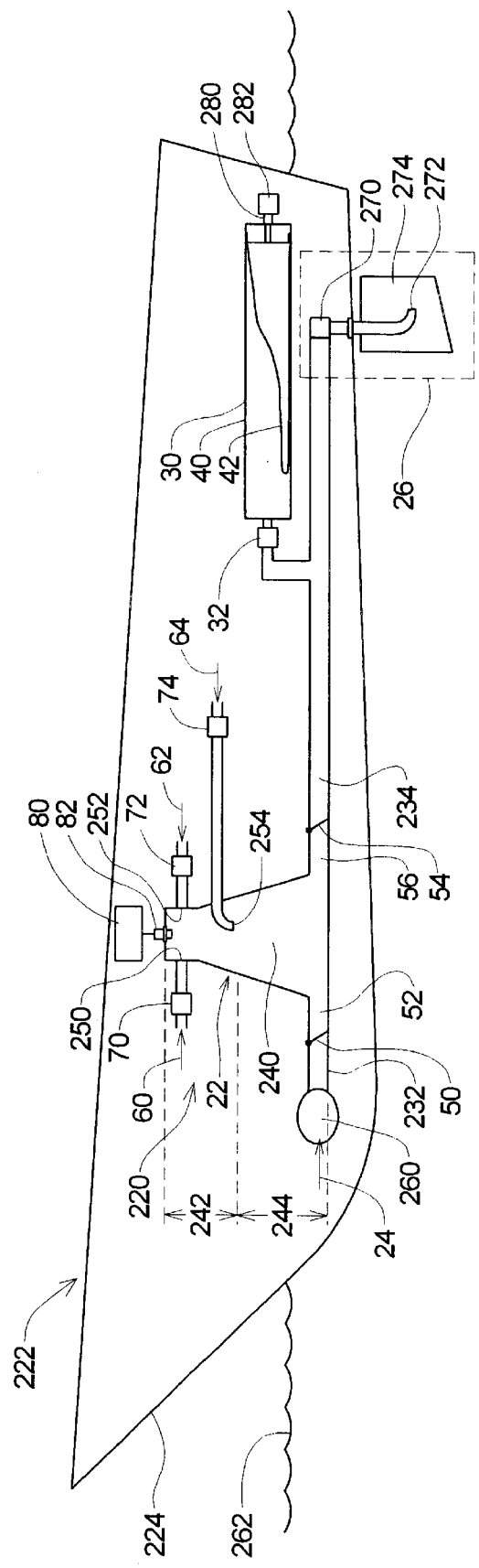
FIG. 9 is a somewhat schematic longitudinal section view of a seventh embodiment of a hydrogen motor of the present invention adapted for use on boats.
Figure 10:
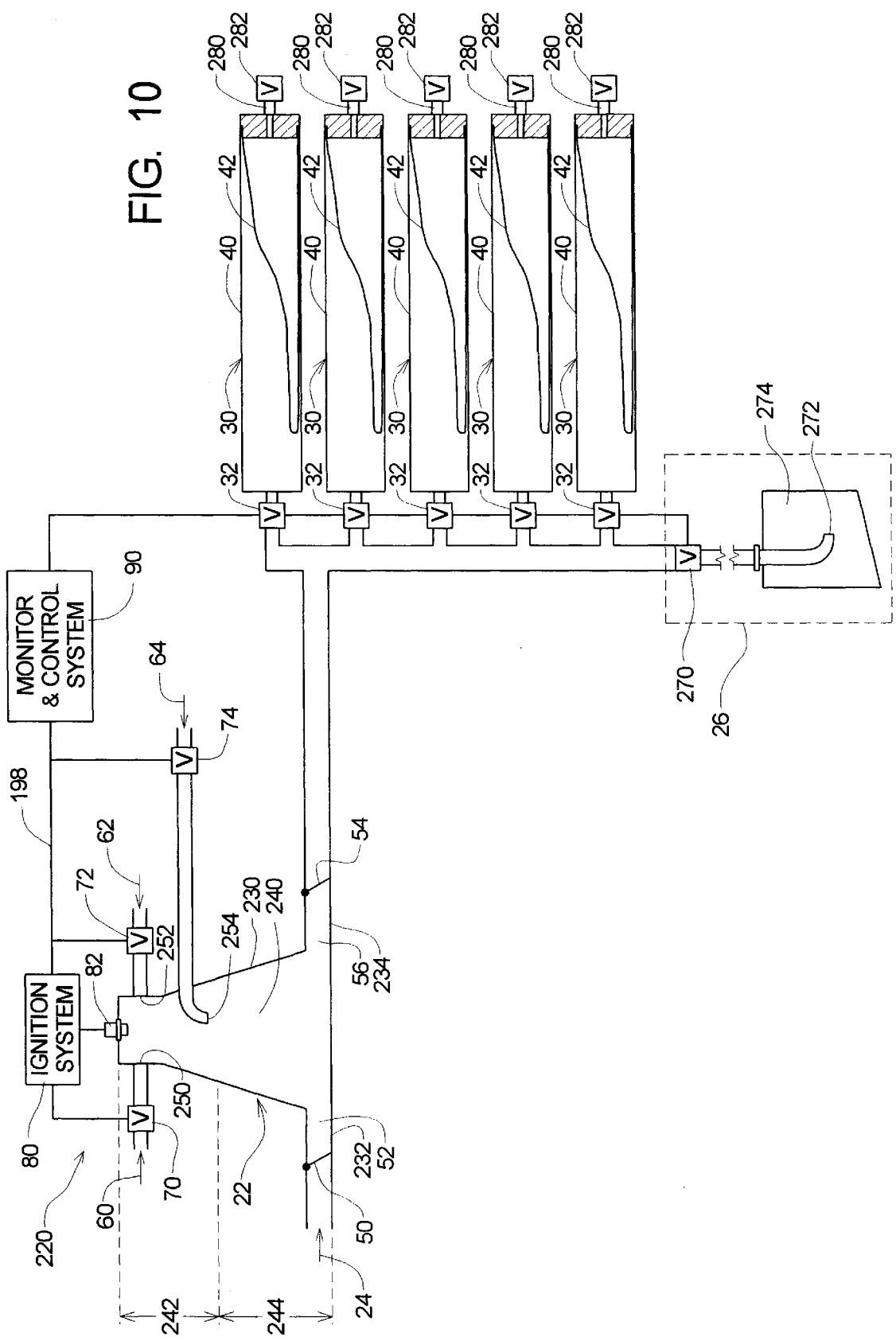
FIG. 10 is a schematic view of the hydrogen motor depicted in FIG. 9.

As shown in FIGS. 9 and 10, the hydrogen motor system 220 comprises a combustion chamber 22, a source of working fluid 24, a propulsion system 26, at least one accumulator 30, and at least one control valve 32. As shown in FIG. 10, the exemplary motor system 220 comprises five accumulators 30 and a control valve 32 for each accumulator 30, but, as generally discussed above, other arrangements are possible depending on the specific use of the motor. The exemplary accumulators 30 comprise a rigid tank member 40 and a bladder member 42. An input check valve 50 is preferably arranged between an inlet 52 of the combustion chamber 22 and the source of working fluid 24, and an outlet check valve 54 connected between an outlet 56 of the combustion chamber 22 and the control valves 32 and propulsion system 26. The combustion chamber 22 is connected to sources of hydrogen 60, oxygen 62, and water 64 (schematically depicted in FIGS. 9–15) through hydrogen, oxygen, and water supply valves 70, 72, and 74, respectively. The exemplary motor system 120 also comprises an ignition system 80, spark plug 82, and a monitor and control system 90. The flow controller described in the '849 patent may be used as the control valves 32 and the supply valves 70, 72, and 74 as generally described above.

The exemplary combustion chamber 22 of the motor system 120 comprises a housing member 230, an inlet pipe 232, and an outlet pipe 234. The housing member 230 defines a housing chamber 240 defining a chamber upper portion 242 and a chamber lower portion 244. The hydrogen, oxygen, and water supply valves 70, 72, and 74 are connected to first, second, and third ports 250, 252, and 254 located in the chamber upper portion 242. The spark plug 82 is located in uppermost portion of the chamber upper portion 242. The inlet pipe 232 and outlet pipe 234 are connected to the chamber lower portion 244. The inlet check valve 50 is arranged in the inlet pipe 232, and the outlet check valve 54 is arranged in the outlet pipe 234.

The exemplary source of working fluid 24 is formed by a port 260 that is formed in the hull 224 of the boat 222. The port 260 is arranged in the hull 224 below a waterline 262 defined by the hull 224 and the water in which the hull 224 floats. As the boat 222 moves through the water, water enters the port 260 and the inlet pipe 232. If the pressure in the housing chamber 240 is lower than the pressure in the inlet pipe 232, water will flow through the inlet check valve 50 and into the chamber 240. If the pressure in the housing chamber 240 is higher than the pressure in the inlet pipe 232, the inlet check valve 50 will close and no water will flow into the housing chamber 240 through the inlet pipe 232. In the exemplary motor system 120, the working fluid is thus water in an open system.

The propulsion system 26 of the exemplary motor system 220 will now be described in further detail. The propulsion system 26 comprises a propulsion valve 270 and a propulsion nozzle 272. The control valves 32 allow pressurized fluid, in this case water, to flow from the accumulators 30 to the propulsion valve 270. The outlet check valve ensures that water flowing out of the accumulators 30 does not reenter the housing chamber 240 when the fluid pressure within the chamber 240 is lower than the pressure within the accumulators 30. The propulsion valve 270 controls the flow of fluid through the propulsion nozzle 272. The propulsion nozzle 272 is configured to direct the fluid flowing therefrom in a direction opposite of the desired direction of travel of the boat 222. Fluid flowing out of the nozzle 272 thus causes the boat 222 to move in the direction opposite to fluid flow out of the nozzle 272. Desirably, the direction of the nozzle 272 relative to a centerline of the boat 222 can be changed to turn the boat 222; a rudder member 274 can be fixed relative to the nozzle 272 to assist in turning the boat 222 in a conventional manner.

The accumulators 30 of the motor system 120 further comprise pressure ports 280 and pressure sensors 282 arranged to detect the pressure of the gas within the bladder members 42; this pressure corresponds to the pressure of the working fluid within the tank member 40 and is used by the monitor and control system 90 to control combustion within the combustion chamber 22.

The monitor and control system 90 of the exemplary motor system 220 comprises a data bus 190 that is operatively connected to the control valves 32, supply valves 70, 72, and 74, ignition system 80, propulsion valve 270, and pressure sensors 192. The monitor and control system 90 thus implements logic that operates the control valves 32, supply valves 70, 72, and 74, ignition system 80, propulsion valve 270 based on the status of data obtained from the pressure sensors 282 and 284. Again, other aspects of the motor system 220, such as water level and pressure in the housing chamber 240, position of the nozzle 272, and the like, can be monitored and used by the monitor and control system 90 to control the operation of the motor 220.

The motor system 220 operates in the same basic manner as the systems 20 and 120 described above. Referring now to FIGS. 11–15, the combustion cycle of the motor system 120 will be described in further detail. Water as working fluid enters the housing chamber 240 through the inlet pipe 232 and inlet check valve 50 (FIG. 11). Initially, the outlet check valve 54 may also be open, allowing water to flow through the housing chamber 240 into the outlet pipe 234. After pressure has built up in the accumulators 30 as will be described below, however, this pressure will maintain the outlet check valve 54 in its closed configuration as shown in FIG. 11 while the housing chamber fills with water to the level shown in FIG. 12.

When the housing chamber 240 is filled, the spark plug 82 is fired, as shown in FIG. 12, to ignite the hydrogen/oxygen mixture, which acts on the water (working fluid) within the chamber 240. In particular, the expanding fluid acts on the water in the direction shown by arrow A in FIG. 13; this increases the pressure of the water within the chamber 240, forcing the inlet check valve 50 closed and the outlet check valve 54 open. Water thus flows out of the chamber 240 through the outlet check valve in the direction shown by arrow B until the chamber is substantially empty. As shown in FIG. 14, after the hydrogen/oxygen mixture is fully combusted and the water is forced out of the chamber 240, water is injected into the chamber 240 to cool the chamber 240 and drop the pressure therein. As the pressure in the combustion chamber 240 drops, the inlet check valve 54 opens and water flows into and fills the chamber 240 through the inlet pipe 232 (FIG. 15). This ignition cycle is repeated until the accumulator pressure reaches the maximum working fluid pressure.

When the pressure of the working fluid within the accumulators 30 exceeds a minimum threshold, the propulsion system 26 may begin to operate by directing the pressurized working fluid through the propulsion nozzle 272 in a desired direction.

The combustion chamber 22 will continuously perform its combustion cycle until the pressure in the working fluid equals the maximum working pressure. If the propulsion system 26 is continuously operating at full power, it is possible that the pressure of the working fluid will never reach the maximum working pressure and the combustion chamber 26 will continuously perform its combustion cycle. Usually, however, the combustion cycle will be performed until the pressure of the working fluid equals the maximum working pressure, at which point the combustion chamber 26 will become idle. The combustion chamber 26 will remain idle until the pressure of the working fluid equals the cut-off pressure, at which point the combustion chamber 26 will begin performing the combustion cycle to re-pressurize the accumulators 30.

The work performed by the propulsion system 26 is thus independent of the work performed when the hydrogen in the combustion chamber 22 is ignited because the energy is stored by the accumulators 30 and released as necessary by the control valves 32. The energy released from the hydrogen ignited in the combustion chamber 22 may thus have extreme highs and lows, which may be desirable to efficiently convert hydrogen into physical work, without disrupting smooth operation of the propulsion system 26.

VIII. General Considerations

The hydrogen motor systems 20, 120, and 220 described above illustrate three preferred embodiments of the present invention. The present invention may be embodied in forms other than those described above without departing from the principles of the present invention.

For example, in the motor system 120, the exemplary valve array 170 and piston assembly formed by the piston housing 172 and piston member 182 provide power to the piston rod 184 in both directions along the longitudinal axis of the rod 184. As an alternative, work may be performed to move the piston member 182 from the first position to the second position, which forces the piston rod 184 in only one direction along the rod axis. Only minimal working fluid pressure would be used to return to piston member 182 from the second position to the first position.

The motor system 120 may also be modified to operate using water as a working fluid, in which case the piston assembly 124 may be simplified or omitted entirely and the cleaning system 126 could be omitted entirely.

In addition, the different arrangements of control valves 32 and outlet check valves 54 shown in FIGS. 1–5 may be used in the systems 120 and 220 described above. In addition, any of the motor systems 20, 20a, 20b, 20c, 20d, 120, and 220 may be modified to use more than one combustion chamber 22 in parallel to charge the accumulators 30.

The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

I claim:

1. A system for converting hydrogen into mechanical energy, comprising:
   a combustion chamber;
   a hydrogen source for introducing hydrogen into the combustion chamber;
   an oxygen source for introducing oxygen into the combustion chamber;
   a water source for introducing water into the combustion chamber;
   an ignition system for igniting a mixture of hydrogen and oxygen in the combustion chamber;
   a source of working fluid, where the source of working fluid is operatively connected to the combustion chamber such that expanding fluid within the combustion chamber acts on the working fluid to pressurize the working fluid;
   an accumulator operatively connected to the combustion chamber such that pressurized fluid within the combustion chamber flows into the accumulator;
   a propulsion system comprising
      a cylinder, and
      a piston member arranged within the cylinder; and
   a control valve operatively connected between the accumulator and the cylinder to control a flow of pressurized working fluid from the accumulator to the cylinder to cause the piston member to move relative to the cylinder.

2. A system as recited in claim 1, further comprising an inlet check valve operatively configured to allow fluid to flow only from the source of working fluid to the combustion chamber.

3. A system as recited in claim 1, further comprising an outlet check valve operatively configured to allow fluid to flow only from the combustion chamber to the accumulator.

4. A system as recited in claim 2, further comprising an outlet check valve operatively configured to allow fluid to flow only from the combustion chamber to the accumulator.

5. A system as recited in claim 1, in which the combustion chamber further comprises a piston assembly, where combustion of the hydrogen within the combustion chamber acts on the working fluid through the piston assembly.

6. A system as recited in claim 5, in which the working fluid is hydraulic fluid.

7. A system as recited in claim 1, in which the piston member converts energy of the pressurized fluid into linear movement.

8. A system as recited in claim 7, in which the propulsion system further comprises a valve array operable in first and second states, where, when the valve array is in the first state, pressurized working fluid forces the piston member in a first direction and, when the valve array is in the second state, pressurized working fluid forces the piston member of the piston assembly in a second direction.

9. A system as recited in claim 8, in which the propulsion system further comprises a power transmission that converts reciprocal movement of the piston member into rotational movement of a shaft.

10. A system as recited in claim 9, in which the shaft is operatively connected to a vehicle transmission.

11. A system as recited in claim 5, in which the piston assembly defines first, second, and third chambers within the combustion chamber, where the hydrogen is ignited in the first chamber, working fluid is pressurized in the second chamber, and working fluid is circulated from the third chamber through a filter to clean the working fluid in the third chamber.

12. A system as recited in claim 1, in which the control valve comprises a flow controller configured to control the flow of fluid from the accumulator to the propulsion system.

13. A system as recited in claim 12, in which the control valve further comprises a check valve arranged in parallel to the flow controller to allow fluid flow from the combustion chamber to the accumulator when a pressure of the working fluid within the combustion chamber exceeds a pressure of the working fluid within the accumulator.

14. A system as recited in claim 1, further comprising a supply valve that controls the flow of fluid from the source of hydrogen to the combustion chamber.

15. A system as recited in claim 1, further comprising a supply valve that controls the flow of fluid from the source of oxygen to the combustion chamber.

16. A system as recited in claim 1, further comprising a supply valve that controls the flow of fluid from the source of water to the combustion chamber.

17. A system as recited in claim 1, further comprising first, second, and third supply valves that control the flow of fluid from the source of hydrogen, source of oxygen, and source of water, respectively, to the combustion chamber.

18. A system as recited in claim 9, further comprising a flywheel operatively connected to the shaft such that rotation of the shaft causes rotation of the flywheel.

* * * * *